United States Patent [19]

Riviere

[11] 4,410,781

[45] Oct. 18, 1983

[54] LAP-SEAMING ELECTRICAL RESISTANCE WELDING MACHINE FOR CAN BODIES

[75] Inventor: Maurice Rivière, Boulogne Billancourt, France

[73] Assignee: Carnaud Emballage, Seine, France

[21] Appl. No.: 270,055

[22] Filed: Jun. 3, 1981

[30] Foreign Application Priority Data

Jun. 5, 1980 [FR] France .................... 80 12493

[51] Int. Cl.³ .................. B23K 11/06; B23K 11/30; B23K 31/06
[52] U.S. Cl. .................. 219/64; 219/61.1; 219/66; 219/81; 219/84
[58] Field of Search .......... 219/81, 82, 83, 84, 219/61.1, 66, 64; 228/149, 150

[56] References Cited

U.S. PATENT DOCUMENTS 3,504,155 3/1970 Opprecht et al. ............ 219/81
3,590,203 6/1971 Gieffers et al. ............ 219/64

FOREIGN PATENT DOCUMENTS 23753 2/1981 European Pat. Off. .
1258185 7/1961 France .
2419134 10/1979 France .

*Primary Examiner*—B. A. Reynolds
*Assistant Examiner*—Alfred S. Keve
*Attorney, Agent, or Firm*—Sughrue, Mion, Zinn, Macpeak and Seas

[57] ABSTRACT

A continuous lap-seaming electrical resistance welding machine for can bodies is disclosed. Two electrode units together define a welding passage, through which laps of sheet metal are passed for welding. Each of the electrode units comprises a band electrode running over an electrode roller having a stationary axis. A band guide roller spaced from the electrode roller(s) in continuation of the welding passage forms a straight-line section between the electrode roller(s) and the associated guide roller. Preferably the guide roller is disposed downstream of electrode roller relative to the direction of displacement of the laps through the welding passage.

10 Claims, 17 Drawing Figures

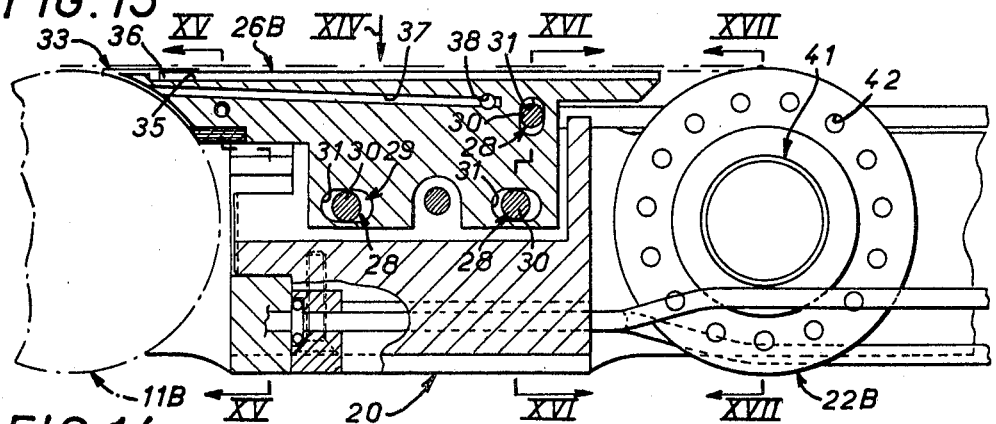
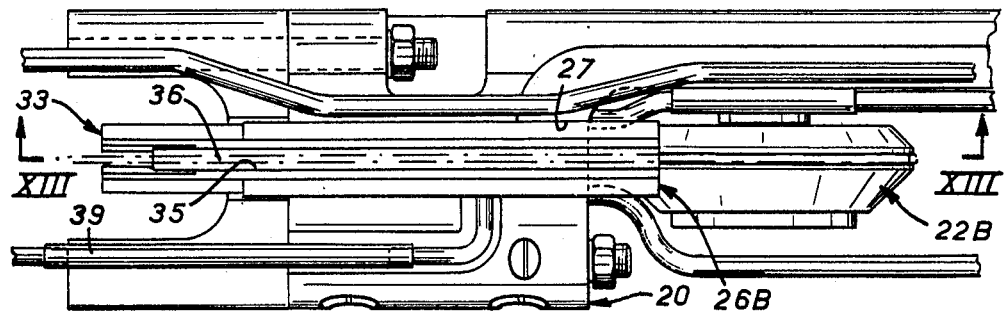
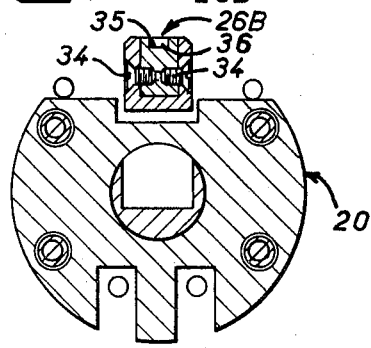
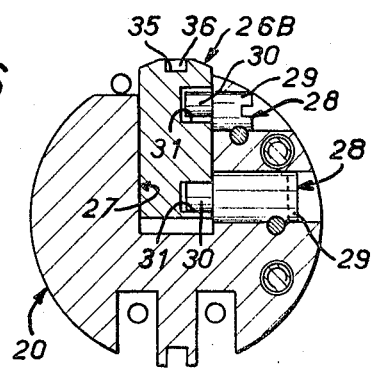
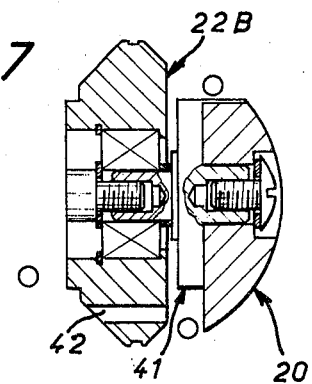

LAP-SEAMING ELECTRICAL RESISTANCE WELDING MACHINE FOR CAN BODIES

The present invention relates generally to electrical resistance welding of lap seams and more particularly though not exclusively to lap seaming of can or tin bodies, e.g., food containers, produced from an initially flat blank.

It has been proposed, in particular in French Pat. No. 1,258,185, to continuously lap seam with a welding machine having two electrode units which together define a welding passage or nip through which the laps of the sheet metal to be seamed pass for welding, each of the electrode units comprising metal band electrode which runs over a roller which is preferably rotatable but has a stationary axis. The band electrodes thus accompany the metal sheets during their displacement as they are welded, the current pulses required for such welding being applied by the electrodes.

The present invention relates precisely to this type of welding machine which operates continuously and is capable of high production rates.

In practice, in the French Pat. No. 1,258,185, the band electrode wound around part of the periphery of the corresponding roller opposite the corresponding zone of the other roller defines the welding passage or nip therewith. Thus, in such a welding passage or nip the surface of contact of the band with the sheet metal to be welded is bowed into the configuration of the roller over which the band electrode is run.

Such a machine has given and continues to give satisfaction. But it has certain drawbacks which relate particularly to the geometry of the resultant lap seam and the homogeneity of the welded metal as will now be brought out.

During welding, when a current pulse is applied the band electrodes become embedded in the sheet metal which is then melted; the band electrodes impart their configuration which, as seen above, is that of the rollers to the sheet metal. Owing to the periodic nature of the pulses alternating peaks and troughs in both of the laps of sheet metal are produced. Indeed, for each welding current pulse the sheet metal which is in a semi-molten state between two weld spots is forced longitudinally between the band electrodes at the moment the following current pulse is delivered to the electrodes which causes the formation of a peak downstream of the nip of welding passage relative to the direction of displacement of the laps.

In practice when welding the bodies of cans or tins the difference of the height between the peaks and troughs thus formed is greater for the inside lap. Indeed, the height difference depends particularly on the diameter of the associated roller, and the roller disposed inside the can body has a diameter which is limited by the size of the body whereas the roller disposed outside the body may, if desired, which is the case in actual practice, have a greater diameter.

The alternating longitudinal geometry of the peaks and troughs in the resulting lap seam has a detrimental effect on the homogeneity of the weld. In fact a peak corresponds to a lower temperature than that of a trough. Furthermore, the metal driven back resulting in the peak is not really forged because it occurs upstream of the welding passage or nip and is not sufficiently hot and it is not subjected to any sort of forging pressure. Moreover, it is not properly cooled. There is therefore a likelihood of heterogeneity of the resulting weld and experience has shown that metal of the weld is weaker at the peaks than at the troughs.

Since the lap seaming takes place on a can or tin after welding it undergoes a beading operation it is not uncommon to find at the crests of the beads starts of cracks when the crests of the beads coincide with the peaks of the weld particularly for the inside lap of the body of the can or tin.

In addition when, as explained above, there is a longitudinal embedding of the band electrodes in the sheet metal of the laps there is a lateral extrusion of the metal which leads to a scalloped configuration when viewed in plan. Since the initial blank for the body of the can or tin has been varnished beforehand, these scallops made the additional varnishing or so-called "contrasting" operation more delicate and difficult, this operation being necessary after seaming to protect the welded metal.

A general object of the invention is to provide an arrangement which overcomes the foregoing drawbacks while ensuring a greater uniformity of the resultant lap seam, amongst other advantages.

According to a more specific object of the invention there is provided a continuous lap-seaming electrical resistance welding machine, in particular for can bodies, comprising two electrode units together defining a welding passage through which laps of sheet metal to be seamed are passed for welding, each of the electrode units including a band electrode running over an electrode roller having a stationary axis, a band guide roller spaced from at least one electrode roller in continuation of the welding passage thereby forming a straight-line section of the corresponding band electrode between at least one electrode roller and its associated guide roller.

In actual practice as the welding machine is used for lap-seaming cans or tins this arrangement is essentially adapted for the electrode operative along the inside lap, the guide roller, according to the invention, associated with the electrode roller is disposed downstream of the same relative to the direction of displacement of the laps through the welding passage in operation.

This arrangement, however, may be adopted for either of the electrode units and the guide roller may be disposed upstream of its associated electrode roller.

In any event owing to the arrangement according to the invention the geometry of the lap seam is improved and therefore its homogeneity or uniformity.

The straight-line section of the band electorde between at least one electrode roller and the guide roller, according to the invention, has the effect of minimizing the formation of the peaks and maintaining pressure on the laps which have just been welded thereby producing an efficient forging of the metal.

In addition the straight-line section advantageously provides rapid cooling of the metal and minimizes the likelihood of oxidation thereof due to its contact with the air.

This results in an overall reduction in the proportion of rejects for a given output.

The straight-line section of the band electrode between at least one electrode roller and the guide roller also advantageously increases the size of the welding passage offered the welding current and a better overlapping of the welding zones ensured by the current.

A better overall distribution of welding energy, a reduction of current losses and therefore better operating conditions for the welding machine are thus produced.

The resulting lap seams are of uniform geometry, without transverse scallops, and with attenuated longitudinally alternating peaks and troughs.

The additional varnishing operation is thus facilitated.

Taking into account the improved geometry another aspect of the present invention is the provision of can bodies whose lap seams are produced by a welding machine having a straight-line band electrode section between the one electrode roller and the guide roller.

To be sure, in the above mentioned French Pat. No. 1,258,185 it is taught that one of the electrodes used may have an elongated rectangular contact surface. Yet, that arrangement is associated with a fixed electrode and not a band electrode which runs over a roller. Further the patent is silent as to the direction of elongation of the electrode, its location with respect to the associated band electrode and the results other than those due to be simplicity resulting from the elimination of the use of such a band electrode.

According to the invention, on the contrary, the band electrode run over the roller defines the straight-line section.

Preferably, in particular for increasing efficiency of the forging of the metal there is provided between at least one electrode roller and the guide roller a stationary support shoe member adapted to support the band electrode. Such a support shoe member ensures the efficiency of the straight-line section of the electrode band by preventing detrimental sagging of the straight-line section between at least one electrode roller and its associated guide roller.

But it has other advantages. First of all, it ensures separation of the band electrode from the electrode roller and therefore avoids accidental entrainment of the band electrode by the electrode roller.

Furthermore, although the straight-line section of the band electrode itself ensures to a certain degree the protection of the metal during welding against corrosion due to the ambient atmosphere, the support shoe member may advantageously be employed, if desired, for the injection of inert gas into the welding passage in order to perfect this protection, especially along the edges of the laps.

For this purpose, the support shoe member has a hollow internal channel which opens on to the edges of the electrode roller and is adapted to be connected to a source of inert gas, such as nitrogen.

It goes without saying, however, that the injection of the inert gas is not mandatory and may not be utilized.

These and other features and advantages of the invention will be brought out in the description which follows, given by way of example, with reference to the accompanying diagrammatic drawings, in which:

FIG. 13 is, on an enlarged scale, a fragmentary longitudinal sectional view taken on line XIII—XIII in FIG. 14 of a practical embodiment according to such a variant;

FIG. 14 is a plan view of this practical embodiment taken in the direction of arrow XIV in FIG. 13; and FIGS. 15, 16 and 17 are cross-sectional views respectively taken along lines XV—XV, XVI—XVI and XVII—XVII in FIG. 13.

Figure 1:
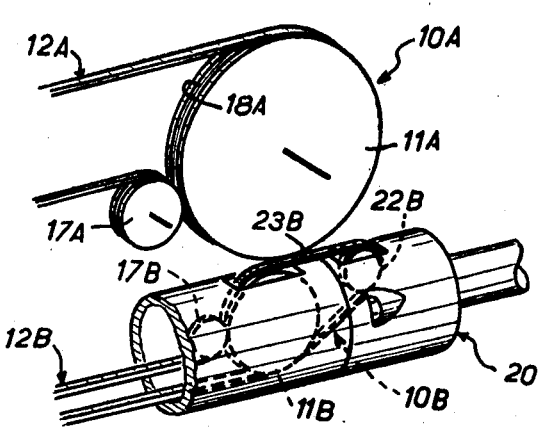
FIG. 1 is a fragmentary view, in perspective, of a welding machine embodying the invention.
Figure 2:
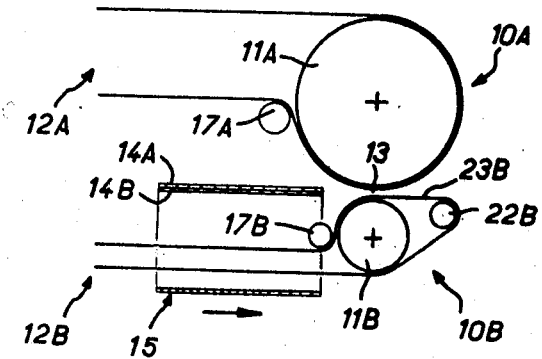
FIG. 2 is a diagrammatic showing, in elevation, of the welding machine illustrating its mode of operation.
Figure 3:
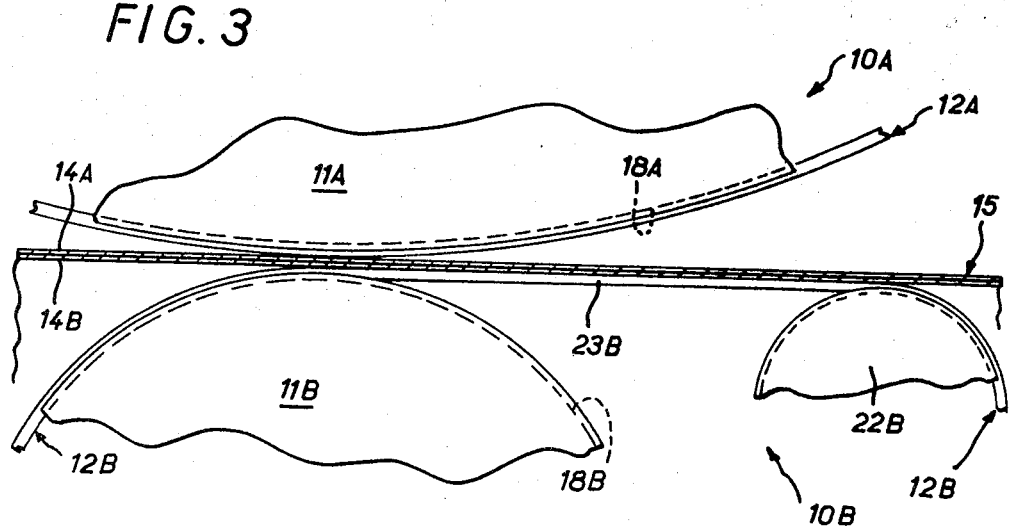
FIG. 3 is, on a greater scale, a fragmentary elevational view of the welding machine when seaming two laps.

The lap seaming electrical resistance machine according to the invention such as illustrated in FIGS. 1-3 is of the type comprising two electrode units 10A, 10B each including a conductive electrode roller 11A, 11B over which runs a metal band electrode 12A, 12B and defines between each other a welding passage or nip 13 through which the sheet metal laps 14A, 14B are displaced in overlying relation during welding. As is known per se the band electrodes 12A, 12B may be separate bands or be successive parts of the same band. Preferably, the electrode rollers 11A, 11B are rotatably mounted on a support. The support for the electrode roller 11A is not shown. The support for the electrode roller 11B, as shown diagrammatically in FIG. 1, usually comprises a cylindrical arm 20 on which the can or tin body 15 to be lap-seamed is received. In any event the axes of the electrode rollers 11A, 11B are in stationary relative positions on their respective supports.

On the other hand the band electrodes 12A, 12B running over electrode rollers 11A, 11B are mobile and in practice during the welding of the laps 14A, 14B they accompany the same.

As illustrated in FIG. 2, the laps 14A, 14B may be formed by the end margins of a can or tin body 15 formed by rolling an initially flat rectangular blank.

The electrode roller 11A of the electrode unit 10A which is adpated to engage the outside lap 14A of the can or tin body 15 has any given diameter but the electrode roller 11B of the electrode unit 10B which is adapted to engage the inside lap 14B of the can body is necessarily of smaller diameter.

In practice as shown diagrammatically each band electrode 12A, 12B runs along at least part of the periphery of its respective electrode roller 11A, 11B as defined by an idle roller 17A, 17B. Each electrode roller 11A, 11B preferably has a groove 18A, 18B along its peripheral edge adapted to suitably guide the corresponding band electrode 12A, 12B.

The foregoing arrangements are well known per se as taught in French Pat. No. 1,258,185 for example, and are not in themselves part of the present invention and therefore need not be described in greater detail herein.

According to the invention at least one guide roller is associated with at least one of the electrode units 10A, 10B at a distance therefrom and in continuity with the welding passage or nip 13, so that the band electrode 12A, 12B forms a straight-line section. Preferably this arrangement is provided for the electrode unit 10B, i.e., the electrode unit inside the can body 15 when welding the seam of such a can body. Such is the case for the embodiment illustrated in FIGS. 1 and 2 where the arrangement according to the invention is adopted for only the inner electrode unit 10B.

Further, in this embodiment as shown, the guide roller 22B thus associated with the electrode roller 11B is disposed to the downstream side of the roller 11B relative to the direction of displacement of the laps 14A, 14B to be seamed. In this case it is therefore defines a return run of the band electrode 12B.

According to the invention, the band electrode 12B thus defines a straight-line section 23B or run between the electrode roller 11B and the guide roller 22B over which it is passed. For example, as shown, since the guide roller 22B is at the same level of the electrode roller 11B the straight-line section 23B is parallel to the direction of displacement of the sheet metal laps to be welded. In any event as illustrated in FIG. 3 this straight-line section 23B advantageously exerts forging pressure on the laps 14A, 14B downstream of the welding zone relative to the direction of displacement of the laps.

Figure 6:
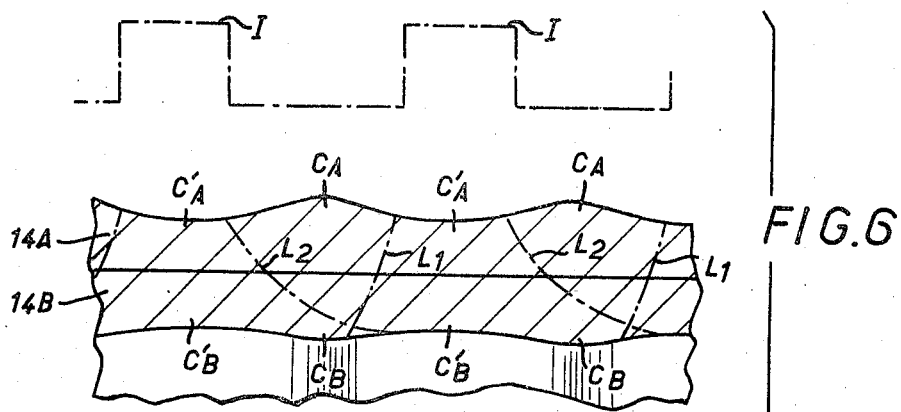
FIG. 6 is, on an enlarged scale, a longitudinal sectional view of the laps taken on the line VI—VI in FIG. 4, together with a showing of the wave form of the corresponding welding current.
Figures 4, 5:
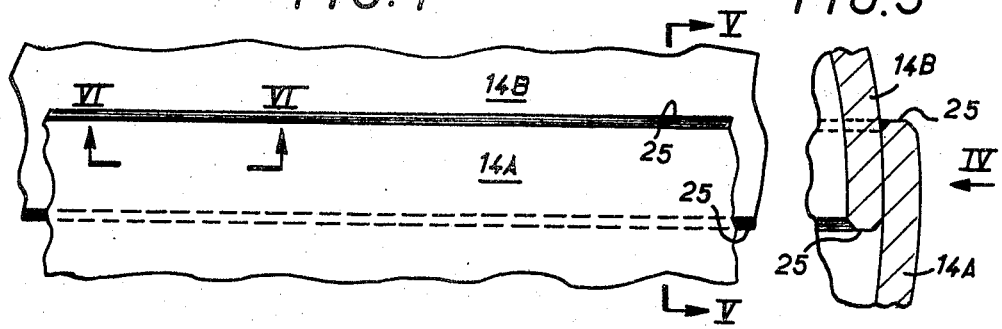
FIG. 4 is a fragmentary plan view of two laps welded with the welding machine according to the invention, taken in the direction of the arrow IV in FIG. 5.
FIG. 5 is a cross-sectional view of the laps taken on the line V—V in FIG. 4.

FIGS. 4–6 illustrate the overall configuration of the lap seam produced.

Figure 9:
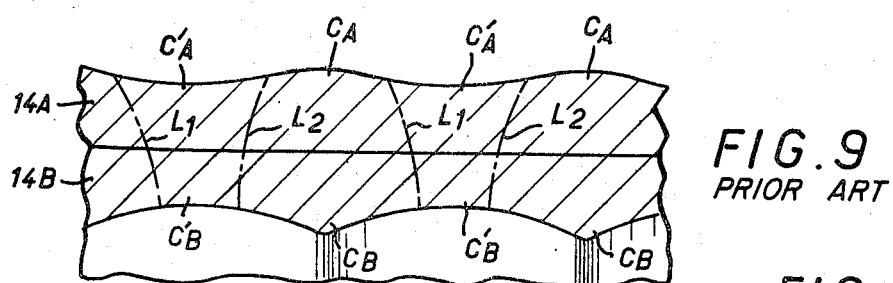
FIGS. 7, 8 and 9 are similar to FIGS. 4, 5 and 6 respectively and relative to the seaming of laps with a prior art welding machine.

The configuration of the lap seam includes, for the lap 14A as well as the lap 14B, longitudinally alternating peaks CA, CB and troughs C'A, C'B. The inside lap 14B has considerably attenuated differences between the heights of the peaks CB and depths of the troughs C'B as compared to those of FIG. 9 which illustrates the result when band electrodes are employed conventionally, without any straight-line section.

As explained above the troughs C'A, C'B correspond to pulses I of the welding current as shown in FIG. 6. In this figure the electric field lines L1, L2 corresponding to each of the pulses are diagrammatically represented by dotted lines, the electric field lines L1 for the upstream wave front of such a pulse and the electric field lines L2 for the downstream wave front thereof.

When the wire electrodes do not have the novel straight-line section, the electric field lines L1, L2 are symmetrical and converge in the direction of the inside lap 14B. Between successive welding current pulses there are cold zones, namely at the peaks CA, CB of the laps.

Thanks to the straight-line section 23B of the band electrode extending from the electrode roller 10B, according to the invention, the electric field line L1 is drawn downstream relative to the direction of the displacement of the laps 14A, 14B during welding so that the electric field lines L1, L2 diverge in the direction of the inside lap 14B, the previously cold zones are thus considerably reduced and the peaks CB are maintained in hot zones.

This arrangement combined with the contact pressure ensured by the straight-line section 23B according to the invention produces good forging of the metal which favors homogeneity or uniformity of the weld.

Figures 7, 8:
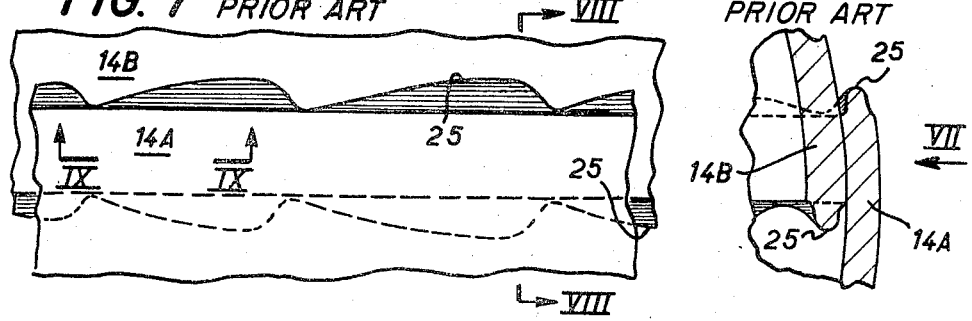

Transversely, the longitudinal edges 25 of the lap seam are substantially straight (FIGS. 4 and 5) whereas the longitudinal edges of the prior art considerably scalloped such as shown in FIGS. 7 and 8 where the band electrode used does not include the noval straight-line section.

Figure 10:
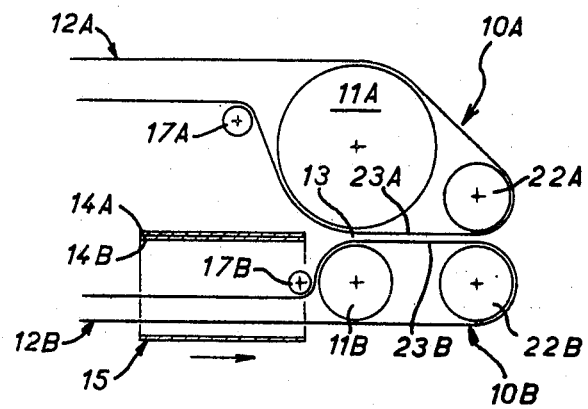
FIGS. 10, 11 and 12 are views similar to that of FIG. 2 each relative to a different alternative embodiment.

In the alternative embodiment illustrated in FIG. 10, each of the electrode units 10A, 10B comprises a guide roller 22A, 22B so that the wire electrode 12A, 12B comprises a straight-line section 23A, 23B in continuation of the welding passage or nip 13. As shown and described above, the guide rollers 22A, 22B are disposed downstream of the electrode rollers 11A, 11B with which they are associated relative to the direction of displacement of the laps 14A, 14B to the seamed. In the illustrated embodiment the guide roller 22B has dimensions comparable to those of the electrode roller 11B with which it is associated and the guide roller 22A has similar dimensions. But this is not necessarily so.

Figure 11:
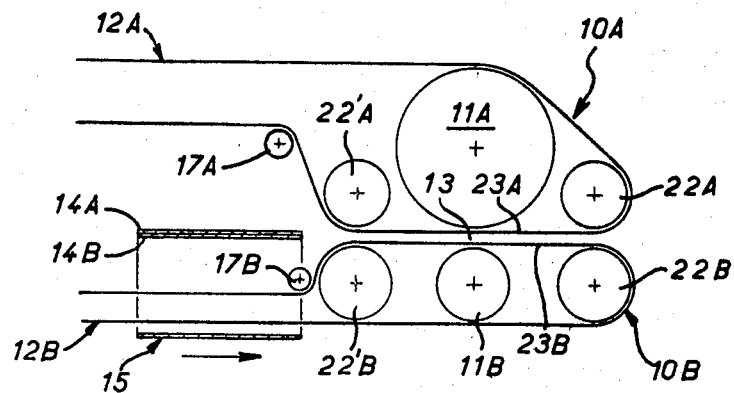

Furthermore, a guide roller for one or both of the electrode units 10A, 10B may be disposed upstream of the electrode roller 11A, 11B with which it is associated relative to the direction of displacement of the laps 14A, 14B to be seamed. For example, as shown in FIG. 11, there is a guide roller 22A, 22B for each of the electrode units 10A, 10B downstream of the respective electrode roller 11A, 11B and guide roller 22'A, 22'B upstream of the electrode roller. Thus the straight-line section 23A, 23B of the corresponding band electrode 12A, 12B extends to either side of the welding passage or nip 13.

It goes without saying, however, that other embodiments may be envisaged which combine or associate various features of the foregoing embodiments.

Figure 12:
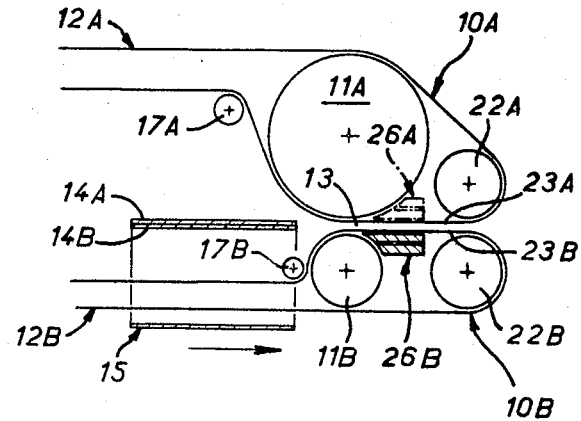

As shown diagrammatically in FIG. 12, relative to the FIG. 10 type of embodiment by way of example, between the electrode roller 11A, 11B of at least one of the electrode units 10A, 10B and the guide roller 22A, 22B associated with the electrode rollers 11A, 11B is disposed a member 26A, 26B referred to herein as the support shoe member. The support shoe member is stationary and adapted to support the corresponding band electrode 12A, 12B and more specifically the straight-line section 23A, 23B thereof.

As shown in FIG. 12, such a support shoe member 26A, 26B is provided for each of the electrode units 10A, 10B. But this is not necessarily the cae. On the contrary, it may be provided for a single electrode unit 10B and that is why, in FIG. 12, the support shoe member 26B is shown in solid lines whereas the support shoe member 26A associated with the electrode unit 10A, which is assumed to be optional, is shown in phantom lines.

A detailed embodiment of a single electrode unit 10B will now be described with reference to FIGS. 13–17. Generally speaking, the support shoe member 26B lies as close as possible to the electrode roller 11B and is adjustable in position on the support arm 20 by means of three eccentric means 28.

Two of the eccentric means 28 are spaced along the support arm 20 for providing transverse adjustment of the height whereas the third eccentric means 28 which is offset from the first two eccentric means permits longitudinal adjustment of the distance from the electrode roller 11B.

Each of the eccentric means 28 comprises a set screw 29 having a threaded shank threadedly engaged in a tapped hole in the support arm 20 which is continued by an eccentric teat 30 in engagement with a slot 31 in the support shoe member 26B. The support shoe member 26B as well as the support arm 11B is made of an ordinary alloy or metal, such as brass.

For any possible contact with the electrode roller 11B and to avoid metal-to-metal contact, preferably as shown, there is provided a member 33, referred to as a nose member, which is made of a material other than metal, such as plastic, and closely follows the contour of part of the contour of the roller. In the illustrated embodiment the nose member 33 is of U-shaped cross-section and is fastened to the support shoe or pad member 26B by two screws 34 as shown in FIG. 15. The nose member 33 protrudes several tenths of a millimeter outwardly from the end of the support shoe member 26B.

To support the band electrode 12B, and more specifically the straight-line section 23B thereof, the support shoe member 26B carries a longitudinally extending pad 36 of a very hard material such as a metal carbide or ceramic. The pad 35 may be secured in a groove 36 provided in the support shoe member 26B for this purpose.

In the illustrated embodiment of FIGS. 13-17 the support shoe member 26B for supporting the band electrode 11B for ensuring the forging of the metal during welding is advantageously utilized, if desired, for injecting inert gas into the welding passage or nip 13. To this end, as shown, a longitudinal channel 37 extends into the shoe member and opens on to the edge of the electrode roller 11B between the wings of the nose 33. The longitudinal channel is adapted to be connected to a source of inert gas such as nitrogen via a lateral passageway 38 and a conduit 39 which is the continuation of the latter. But, taking into account the containment of the welding zone ensured by the support shoe 26B the injection of such an inert gas is not essential. Yet, as mentioned above, it is advantageous in order to avoid possible corrosion of the edges of the laps 14A, 14B being welded.

Obviously the nose member 33 of the shoe member 26B does not necessarily touch the electrode roller 11B. If there were actual contact there would be a certain amount of wear. Accordingly it is preferable to arrange the shoe member at a slight distance from the electrode roller 11B. In this case, when injecting inert gas into the welding passage there will be lateral leaking of the inert gas. Still, such leaking is acceptable bearing in mind the narrowness of the corresponding interstitial spaces.

However, if desired, according to a nonillustrated modified embodiment, the nose member 33 of the shoe member 26B may be longitudinally slidably mounted thereon and permanently biased by resilient means, such as a spring, into contact with the electrode roller 11B to compensate automatically for any wear due to contact.

Preferably, as shown in FIGS. 13-17, the guide roller 22B as well as the support shoe member 26B is adjustable in position on the support arm 20 which carries it. For example, as shown in FIGS. 13 and 17 the guide roller 22B is carried by an eccentric means 41.

The guide roller 22B may as shown be provided with circularly spaced vent holes 42 for cooling. Alternatively, as is usually the case for the electrode roller 11B, the guide roller 22B is water cooled.

It is not necessary that the straight-line section of the wire electrode or electrodes according to the invention be absolutely parallel to the direction of displacement of the laps to be welded. On the contrary they may be merely substantially parallel to the direction of displacement. It is even possible to provide intentially a greater or lesser angle with respect to the direction of displacement although, preferably, it lies in the plane which contains the direction of displacement and is perpendicular to the axes of the electrode rollers.

The field of use of the invention is not limited to that of lap seam can or tin bodies, such as for food containers, with respect to which it has been described but includes, on the contrary, continuous lap-seam welding of any metal sheet.

What is claimed is:

1. A continuous lap-seaming electrical resistance welding machine comprising two electrode units cooperatively defining a welding passage through which laps of sheet metal to be seamed are passed for welding, each of said electrode units including a band electrode running over at least one electrode roller having a stationary axis, at least one of said electrode units being provided with at least one band supporting guide roller located in the vicinity of said at least one electrode roller in continuation of said welding passage and downstream thereof relative to a direction of displacement of said laps through said welding passage, whereby a straight-line section of said band electrodes between said at least one electrode roller and said supporting guide roller of said two elctrode units is provided.

2. The welding machine according to claim 1, wherein said at least one supporting guide roller and said at least one electrode roller of each of said electrode units are arranged so that said straight-line section of the corresponding band electrode is substantially parallel to the direction of displacement of the laps through said welding passage.

3. The welding machine according to either claim 1 or claim 2, wherein at least one of said electrode units further comprises a support shoe member disposed between said one electrode roller and said supporting guide roller of said at least one electrode unit for further supporting said straight-line section of the corresponding band electrode.

4. The welding machine according to claim 3, wherein said shoe member is only slightly outwardly spaced from said at least one electrode roller.

5. The welding machine according to claim 3, wherein said shoe member is adjustably mounted on a support arm.

6. The welding machine according to claim 3, wherein said shoe member has a protruding nonmetallic nose member which closely circumscribes part of the peripheral contour of said one electrode roller for possible contact therewith.

7. The welding machine according to claim 3, wherein said shoe member has a longitudinally extending pad of very hard material.

8. The welding machine according to claim 3, wherein said shoe member has means for injecting inert gas into said welding passage comprising a channel which opens onto the peripheral edge of said one electrode roller and which is adapted to be connected to a source of inert gas.

9. The welding machine according to claim 1, wherein, for welding of can bodies, said at least one electrode roller of said electrode units is an inner electrode roller with respect to a can body being welded and the corresponding band electrode is adapted to engage an inside lap of said can body.

10. The welding machine according to claim 1, wherein both said electrode units comprise at least one band supporting guide roller.

* * * * *